No. 877,946. PATENTED FEB. 4, 1908.
J. L. OVERTON.
APPARATUS FOR CONTAINING AND INJECTING SERUMS AND OTHER SUBSTANCES.
APPLICATION FILED FEB. 4, 1907.

WITNESSES.

INVENTOR.
James L. Overton
by Foster Freeman Watson
attys

UNITED STATES PATENT OFFICE.

JAMES LEONARD OVERTON, OF LONDON, ENGLAND, ASSIGNOR TO HENRY SOLOMON WELLCOME, OF LONDON, ENGLAND.

APPARATUS FOR CONTAINING AND INJECTING SERUMS AND OTHER SUBSTANCES.

No. 877,946.  Specification of Letters Patent.  Patented Feb. 4, 1908.

Application filed February 4, 1907. Serial No. 355,719.

*To all whom it may concern:*

Be it known that I, JAMES LEONARD OVERTON, a subject of the King of Great Britain, residing at London, England, have invented a new and useful Improvement in Apparatus for Containing and Injecting Serums or other Substances, of which the following is a specification.

The object of this invention is to produce apparatus for containing and injecting serums or other substances and to insure the prevention of contamination after sterilizing has first been effected of both the serum or other substance and of the injecting needle and its connector, and to effect these essential ends in an apparatus capable of being easily handled and cheaply constructed.

The present invention relates to apparatus of the general class above indicated and is more particularly hereinafter defined with reference to the accompanying drawings, in which:—

Figure 1:
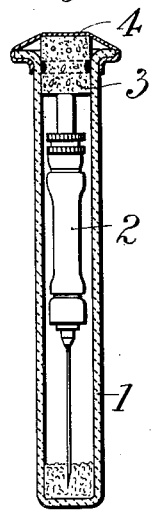
Figure 2:
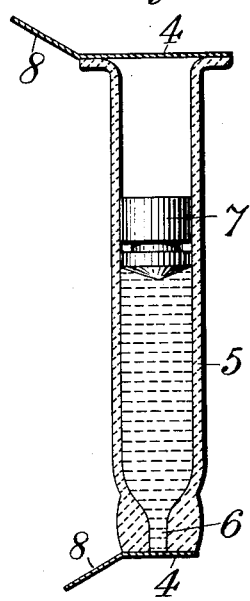
Figure 3:
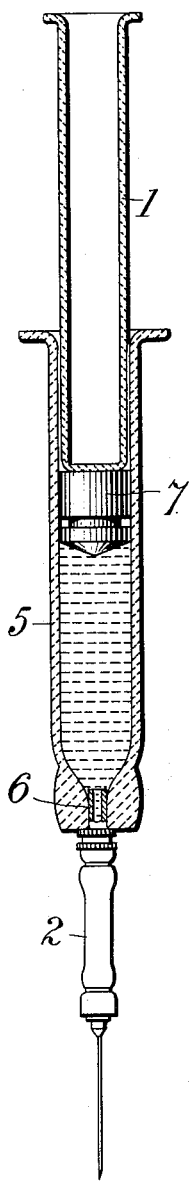

Figure 1 shows the injecting needle and connector sealed in their receptacle which also acts as the piston rod for operating the piston when the syringe is in use. Fig. 2 shows the container also sealed in accordance with this invention and Fig. 3 shows the position of the parts when the syringe is to be used.

As shown the glass tube 1 and needle and connector 2, consisting of a rubber tube and a hollow nipple 6 after sterilization are sealed by a cork or disk 3, which is preferably supplemented by a sealed closure 4, of impermeable material such as silk or other suitable substance coated or impregnated with a material of high melting point and at the same time adhesive, such for example as one or more waxes mixed with a resinous substance such as Canada balsam.

By experiment it is judged that a mixture of hard paraffin B. P. 2 parts, white wax B. P. 1 part and Canada balsam 1 part, will make a suitable mixture which can be applied to the silk or other suitable substance selected and that a closure so formed will be effective for considerable periods even under changing climatic influences.

The container consists of a tube, preferably of glass, open at both ends but one end contracted to form a smaller opening or socket for the reception of the hollow nipple 6. Each end of the tube is so formed as to present a broad flat annular face, the tube being thickened at the lower end and flanged at the upper end for this purpose, and such broad flat face enabling me to hermetically seal each end by means of the flat seal 4 of suitable material, as for instance a coated fabric. This flat seal is cemented to the annular flat face by means of a suitable cement with which the fabric is coated, or which is applied to the coated fabric, said cement preferably being the same as that applied for sealing the tube 1.

Within the container tube 5 is a piston 7 which instead of being connected with a piston-rod is free to move within said tube and rests upon the serum or other substance which is introduced after the parts of the device have been thoroughly sterilized, after which the openings are sealed. Preferably the sealing disk or plate at the top of the tube is provided with a short projecting tab 8 thereon so that the closure can be readily removed at the desired time and a similar closure may be placed over the other end of the container behind the piston but this is not so essential.

When it is desired to make an injection the needle and connector are removed from tube 1, and the closure over opening 6 having been removed the inner end of connector is placed therein while tube 1 is utilized as a piston rod to propel the piston. By employing an opening 6 instead of the usual nozzle, the former can be covered and protected from any contamination, by means of the closure of fibrous material 4 and hence the connector has a perfectly clean surface for its attachment.

What is claimed is:—

1. In an apparatus for injecting serum, etc., the combination of a container consisting of a tube having two open ends, a piston freely movable within the tube, a seal for hermetically sealing each end of the tube, the parts constructed to permit the introduction of a plunger after removing the seal from one end, and a needle and means for connecting it to the opposite end of the tube after removing the seal.

2. A container for the serum injector consisting of a tube having at each end a broad annular flat face, and a flat seal for each end and means for hermetically cementing said seal to each annular face.

3. A container for the serum injector consisting of a tube having at each end a broad annular flat face and a flat seal for each end, and an ear projecting from the seal for the purpose specified.

In testimony whereof I have hereunto set my hand in the presence of two subscribing witnesses.

JAMES LEONARD OVERTON.

Witnesses:
A. E. WARDEN,
E. M. SELLERS.